(12) United States Patent
Stakhanova et al.

(10) Patent No.: US 9,413,598 B2
(45) Date of Patent: Aug. 9, 2016

(54) GRAPH STRUCTURES FOR EVENT MATCHING

(75) Inventors: Natalia Stakhanova, Fredericton (CA); Ali-akbar Ghorbani, Fredericton (CA); William Bird, Estey's Bridge (CA)

(73) Assignee: International Business Machines Corporation, Armonk, NY (US)

( * ) Notice: Subject to any disclaimer, the term of this patent is extended or adjusted under 35 U.S.C. 154(b) by 1608 days.

(21) Appl. No.: 12/553,040

(22) Filed: Sep. 2, 2009

(65) Prior Publication Data

US 2011/0055924 A1    Mar. 3, 2011

(51) Int. Cl.
*H04L 29/06* (2006.01)
*H04L 12/24* (2006.01)
*G06F 21/55* (2013.01)

(52) U.S. Cl.
CPC ............ *H04L 41/0631* (2013.01); *G06F 21/55* (2013.01); *H04L 63/1416* (2013.01)

(58) Field of Classification Search
CPC ............................. G06F 21/55; H04L 63/1416
USPC .......................................................... 726/23
See application file for complete search history.

(56) References Cited

U.S. PATENT DOCUMENTS

| | | | | |
|---|---|---|---|---|
| 7,150,044 B2* | 12/2006 | Hoefelmeyer | ...... | H04L 63/0272 709/223 |
| 7,203,744 B1* | 4/2007 | Parekh | ................ | H04L 41/0893 709/223 |
| 8,250,008 B1* | 8/2012 | Cao | ......... | G06Q 30/02 370/392 |
| 2002/0112185 A1* | 8/2002 | Hodges | ................... | H04L 29/06 726/23 |
| 2003/0188189 A1* | 10/2003 | Desai | .................... | H04L 63/145 726/23 |
| 2004/0193943 A1* | 9/2004 | Angelino | ............ | H04L 63/1408 714/4.1 |
| 2005/0193429 A1* | 9/2005 | Demopoulos | ....... | H04L 63/0254 726/23 |
| 2005/0289219 A1* | 12/2005 | Nazzal | ................ | H04L 63/1441 709/203 |
| 2006/0017557 A1* | 1/2006 | Chung | ................ | H04L 63/1408 340/515 |
| 2007/0118906 A1* | 5/2007 | Mustafa | ................ | G06F 21/554 726/23 |
| 2009/0190592 A1* | 7/2009 | Hsieh | ...................... | H04L 45/48 370/392 |
| 2010/0169475 A1* | 7/2010 | Woundy | .............. | H04L 41/0896 709/224 |
| 2011/0055924 A1* | 3/2011 | Stakhanova | ............ | G06F 21/55 726/23 |

* cited by examiner

*Primary Examiner* — Dao Ho
(74) *Attorney, Agent, or Firm* — Francis Lammes; Stephen J. Walder, Jr.; Gail Zarick (57) ABSTRACT

A system for matching a system event to a rule is disclosed. The system includes a computer-readable data structure comprising a plurality of system event rules organizable as a partially ordered set. The system also includes a processor configured to analyze the computer-readable data structure to determine whether an event matches a description set of at least one rule from the plurality of system event rules. Methods and machine-readable mediums are also disclosed.

13 Claims, 11 Drawing Sheets

Algorithm 1: void insertRule(RuleGraph $RG$, Rule $R$)

1  foreach $f \in F_R$ do
2      if *root has child node n s.t.* $f \neq n(CF) \in RG$ then
3         if $F_R = n(CF)$ then
4            add $R$ to $n$;
5         else
6            traverseNode($n|f = n(CF), R$);
7      else
8         create node $n|f \in n$;
9         insert $n$ as Child of $RG(root)$;
10        if $F_R = n(CF)$ then
11           add $R$ to $n$;
12        else if *R is not inserted yet* then
13           create node $ch|ch(CF) = F_R$;
14           add $R$ to $ch$;
15           insert $ch$ as child of $n$;
16        else
17           update links between $n$ and node $|R \in node$;
18     add value $v$ of $f$ to $V_n$;

Algorithm 2: void traverseNode(Node $node$, Rule $R$)

1  Let $R \in n$;
2  foreach $ch \in Children(node)$ do
3      if $R \in ch$ then
4         return;
5      if $F_R = ch(CF)$ then
6         add $R$ to $ch$;
7         let $n=ch$;
8         return;
9      else if $F_R \subset ch(CF)$ then
10        insert $n$ as Parent of $ch$;
11        update links;
12     else if $ch(CF) \subset F_R$ then
13        add $ch$ to $supersetList$;
14     else if $!F_R \cap ch(CF) = \emptyset$ then
15        create node $m$ such that $m(CF) = F_R \cap ch(CF)$;
16        insert $m$ as Parent of $ch$;
17        insert $n$ as Child of $m$;
18 foreach $ch \in supersetList$ do
19     traverseNode($ch, R$);
20     if $Children(ch) = \emptyset$ then
21        insert $n$ as Child of $ch$;
22        update links;

Algorithm 3: boolean deleteRule(Node $n$, Rule $R$)

| | |
|---|---|
| 1 | bool found = false; |
| 2 | if $n(CF) = 0 \;||\; F_R \in n(CF)$ then |
| 3 |     foreach Child(n) && while found = false do |
| 4 |         found = deleteRule(Child(n), R); |
| 5 | else |
| 6 |     if $FR \neq n(CF)$ then |
| 7 |         return false; |
| 8 |     else |
| 9 |         if $|n(S)| = 1$ then |
| 10 |             removeNode($n$); |
| 11 |             if Children(n)! = $\emptyset$ then |
| 12 |                 update links between Children(n) and Parents(n); |
| 13 |         else |
| 14 |             remove $R$ from $n$; |
| 15 |             remove value of $R$ from $V$; |
| 16 |         return *true*; |
| 17 | return *found*. |

Algorithm 4: void eventMatch (RuleGraph *RG*, Event *e*)

1   Initalize *matchSet*;
2   Set matchedRules;
3   Set queue;
4   forall $V_i$ where $f_i \in F_R$ do
5       if $v \in V_i = v \in F_R$ then
6           add $f_i$ to matchSet;
7   sort *matchSet* by weight of fields;
8   while *matchSet* is not empty do
9       foreach $n|CF(n) = f, f \in matchSet$ do
10         if $match(e, R \in n) \neq 0$ then
11            update *matchedRules*;
12         matchedRules=traverseMatch($n \in matchSet, matchSet, e$);
13         if *no new rules were added to matchedRules or queue in this round* then
14            remove *n* from *matchSet*;
15         evaluate (& process if weight permits) pending fields in queue;
16   Return *matchedRules*;

Algorithm 5: void traverseMatch (Node *node*, *matchSet*, Event e)

1   Let $R \in n$;
2   bool eventMatched = false;
3   Set matchedRules;
4   foreach $ch \in Children(node)$ do
5       if $ch(CF) = matchSet$ then
6          matchedRules + = match($e, R \in ch$);
7       else if $ch(CH) \subset matchedSet$ then
8         (     /* several rules can match one event */)
9          matchedRules + = match($e, R \in node$);
10         matchedRules + = traverseMatch($ch, matchSet, e$);
11   return matchedRules;

Algorithm 6: void weightedMatch (Event *e*, Rule *R*)

1   if *for all $f_i \in F_R$, $w(f_i) \leq w(f_{current})$, $f_{current} \in matchedSet$* then
2       check if $v_i = v_{current}$;
3       if *satisfied* then
4          return *R*;
5       else
6          return;
7   else if $\exists f_i \in f_R$, s.t. $w(f_i) \not\leq w(f_{current})$ then
8       add *R* to pending queue;

Rule table

| R1 | $F_1$={a, b, g, k} | $V_1$={1, 2, 7, 3} |
| R2 | $F_2$={a, b, g, m} | $V_2$={1, 3, 7, 8} |
| R3 | $F_3$={g, k} | $V_3$={4, 5} |
| R4 | $F_4$={a, b} | $V_4$={-1, 2} |
| R5 | $F_5$={g, m, l} | $V_5$={4, 8, 0} |

*Rule table*

| | | |
|---|---|---|
| R1 | $F_1$={garage door, alarm} | $V_1$={open, ON} |
| R2 | $F_2$={garage door, alarm} | $V_2$={closed, ON} |
| R3 | $F_3$={alarm, time} | $V_3$={ON, 9am-4pm} |
| R4 | $F_4$={motion sensor, period} | $V_4$={ON, Vacation} |
| R5 | $F_5$={garage door, motion sensor, period} | $V_5$={open, OFF, Vacation} |

Rule table

| | | |
|---|---|---|
| R1 | $F_1$={root auth., count} | $V_1$={failed, > 2} |
| R2 | $F_2$={root auth., time} | $V_2$={succesful, 7pm-7am} |
| R3 | $F_3$={syscheck alert, file} | $V_3$={true,/usr/bin/*} |
| R4 | $F_4$={root auth.,syscheck alert,file} | $V_4$={succesful,true,/etc/password} |
| R5 | $F_5$={user auth.,time, failure count} | $V_5$={failed,9am-5pm,> 3} |

GRAPH STRUCTURES FOR EVENT MATCHING

BACKGROUND

1. Field

The present disclosure generally relates to computer software, and more particularly to electronic security.

2. Description of the Related Art

The rapid development of electronic devices, the Internet, World Wide Web and E-commerce has made it increasingly important to be able to monitor the traffic going into and coming out of an electronic device. Monitoring such traffic, such as in a computer network, allows for the discovery of abnormal traffic that may be an indication of attacks from hackers or misuse of resources.

For computer networks, various network and computer security software, such as firewalls, Intrusion Detection Systems (IDS), network monitors, and vulnerability assessment tools, have been developed to protect a network or host computer from abuse and hacking. IDSs are used to spot, alert, and stop intrusions. Typically running on dedicated computers connected to the network, IDS systems actively monitor network traffic for suspicious activities.

IDS generally implement a signature-based approach in which attacks are detected by analyzing an incoming event (e.g., activity on the network or in the host) against every rule in a predefined set of rules ("rule set") that generally describe the IDS-specific set of network features (e.g., destination port, payload content) or system events (e.g., privileged file access, login time) and deploying a response action in case the event matches the description set in a predefined rule. The size of rule sets continues to increase according to the increasing use of computer systems. Although the time it takes to determine if an incoming event matches a rule in the rule set ("event matching") increases proportionately to the increase in size of the rule set, there remains a demand for near real-time event matching.

SUMMARY

There is a need for an event matching system that is capable of more quickly matching an incoming event against a detection rule in a set of detection rules without having to evaluate every rule in a rule set. According to certain embodiments of the present disclosure, the disclosed systems and methods provide for the efficient analysis of detection rules in a set of detection rules. Certain embodiments of the systems and methods include a rule management data structure and algorithms for event matching using the rule management data structure. The rule management data structure is, in certain embodiments, a rule relations graph that stores rules from a rule set as a partially ordered set.

In certain embodiments of the disclosure, a system for matching a system event to a rule is provided. The system includes a computer-readable data structure comprising a plurality of system event rules organizable as a partially ordered set. The system also includes a processor configured to analyze the computer-readable data structure to determine whether an event matches a description set of at least one rule from the plurality of system event rules.

In certain embodiments of the disclosure, a method for matching a system event to a rule is provided. The method includes generating a match set based an incoming system event, and identifying at least one node, in a rule relations graph, associated with a set of fields that is a subset of, or equal to, the set of fields associated with the match set. The method also includes processing, using a computer, at least one rule associated with the at least one node.

In certain embodiments of the disclosure, a system for matching a system event to a rule is provided. The system includes a computer-readable data structure comprising a plurality of detection rules organizable as a partially ordered set. The system also includes a processor configured to generate a match set based on the system event, and identify whether at least one rule, from a plurality of detection rules, is associated with a set of fields that is a subset of or equal to, a set of fields associated with the match set, and whether the values associated with the set of fields associated with the at least one rule match the values associated with the set of fields associated with the match set. The processor is further configured to initiate at least one response action associated with the at least one rule if the set of fields associated with the at least one rule is a subset of, or equal to, a set of fields associated with the match set, and if the values associated with the set of fields associated with the at least one rule match the value associated with the set of fields associated with the match set.

In certain embodiments of the disclosure, a machine-readable medium encoded with instructions for matching a system event to a rule is provided. The instructions include code for generating a match set based an incoming system event, and identifying at least one node, in a rule relations graph, associated with a set of fields that is a subset of, or equal to, the set of fields associated with the match set. The instructions also include code for processing at least one rule associated with the at least one node.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

There is a problem in intrusion detection systems of an increasingly unacceptable amount of time being necessary to match a system event to a rule in a rule set as the size of the rule set increases. This and other problems are solved, at least in part, by embodiments of the present disclosure, which include a system for matching a system event to a rule. The system includes a computer-readable data structure comprising a plurality of system event rules organizable as a partially ordered set. The system also includes a processor configured to analyze the computer-readable data structure to determine whether an event matches a description set of at least one rule from the plurality of system event rules.

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail so as not to obscure the disclosure.

As discussed herein, an event on a system ("system event") is an occurrence of significance to a task of the system in a network or host environment. Exemplary events can include completion or failure of an operation on the network, a user action on the network, or the change in state of a process on the network.

Figure 1A:
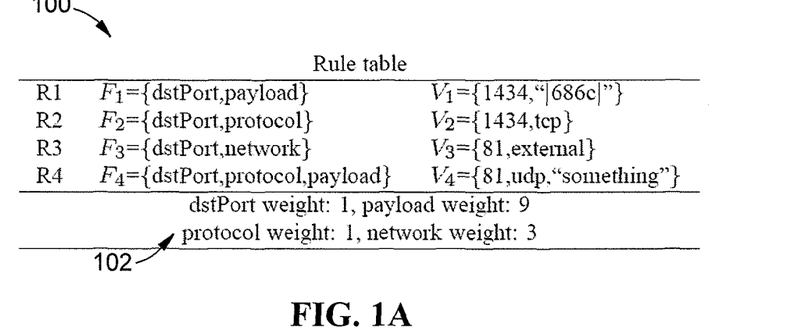
FIG. 1A illustrates an exemplary rule table for network events according to one embodiment.

FIG. 1A illustrates an exemplary rule table 100 for network events according to one embodiment. The rule table 100 includes a plurality of rules, $R_1$ to $R_4$, each rule associated with a set of fields, $F_1$ to $F_4$, and each set associated with a set of values, $V_1$ to $V_4$. The rule table 100 also includes weights 102 associated with each field. As discussed herein, in the context of intrusion detection, a rule can be defined as a set of conditions to be met, referred to as a conditional part of the rule, for an action to be triggered. The action defines measures to be taken if the conditional part of the rule is satisfied. In certain embodiments, a rule is associated with a description set that includes at least one field (e.g., a condition to be matched) including a value associated with the field, and at least one action to be taken if all of the fields are matched. Exemplary fields include, for example, a port number field, a payload size field, a network type field, an IP protocol field, a TCP flag field, and a file access field.

In certain embodiments, a rule can be formally defined as a tuple $R_i=(C_i,A_i)$, where $C_i$ is a predicate defined on a set of conditions $c_1, c_2, \ldots, c_n$ and $A_i$ is an action. A condition $c \in C_i$ is defined as a (f, v) tuple, where $f \in F_i$ is a field monitored by an IDS and $v \in V_i$ represents the numerical or descriptive value (or range of values) assigned to the corresponding field. $F=\cup F_i$ denotes the set of all fields represented in the rule collection.

Figure 1B:
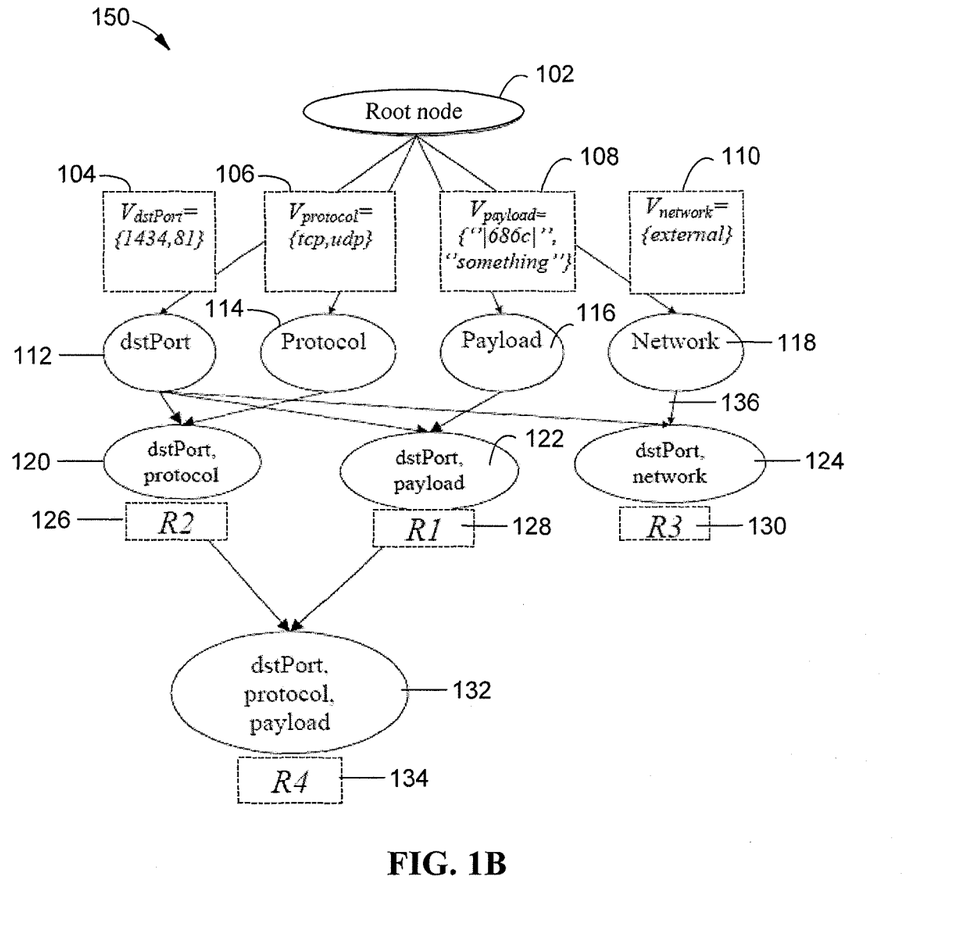
FIG. 1B illustrates a directed graph representing the table of FIG. 1A, according to certain embodiments of the disclosure.

FIG. 1B illustrates a directed graph representing the table of FIG. 1A, according to certain embodiments of the disclosure.

A rule relations graph as discussed herein is, in certain embodiments, a partially ordered set of rules. In certain embodiments, a rule relation graph RG={N, E, V} is a partially ordered set comprised of a set of distinct nodes N, a set of edges E, and a set of value sets V. A node $n \in N$ is defined as {CF, S} tuple, where CF is the set of fields $\{f_1, f_2, \ldots, f_k\} \in F$, S is the set of rules defined as $S=\{R_i, R_i \in \text{RuleCollection}, F_i=CF\}$. An edge $e \in E$ connects two nodes $n_1$ and $n_2$ such that $n_1(CF) \subsetneq n_2(CF)$. Then, $n_2$ is called a child node of $n_1$, Child($n_1$), $n_1$ is denoted as a parent node of $n_2$, Parent($n_2$) and consequently, a set of all child nodes of $n_1$ is considered as Children($n_1$), and a set of all parent nodes of $n_2$ is denoted as Parents($n_2$). A value set $V_i \in V$ corresponds to each of the nodes $n_i \in N$, where |CF|=1 and presents a set of all values v of a field $f_i \in CF$ found in all $R \in$ Rule Collection, where $f_i \in F_R$.

In certain embodiments, a rule relations graph can be stored as a data structure. The data structure can be, for example, a lattice data structure. In certain embodiments, a rule relations graph can be represented as a directed graph 150, e.g., where any two vertices (or "nodes") are connected by one path (or "edge" or "link" or "connection"). For example, nodes 118 and 124 are connected by path 136. A node in the graph can be used to represent a rule from the rule set (e.g., node 120 is associated with rule R2 126), or at least one field associated with the rule set. In certain embodiments, the rule relations graph does not include all permutations of the fields from the rule set. The directed graph 150 is a rooted graph in that one node 102 is designated as the root node 102. As discussed herein, in a directed graph 150, the parent of a node is the node connected to it on the path to the root node 102; every node except the root node 102 has a parent. A child of a node v is a node of which v is the parent. A leaf node is a node without children. For example, node 112 is the parent of node 120, and node 132, a leaf node, is the child of node 120. The child nodes of the root node of the directed graph 150 are also associated with value sets 104, 106, 108, and 110, illustrated in FIG. 1B in phantom. Each value set is associated with a field included in the rule relations graph, and, in certain embodiments, includes all values associated with that field in the rule relations graph. For example, value set 104 is associated with the field "dstPort" and the values "1434" and "81," for the field "dstPort."

The directed graph 150 is partially ordered in accordance with the rule relations graph it represents. Excluding the root node 102, each node in the graph is a superset of each of its parents and equal to all its parents combined. For example, the set of fields "dstPort" and "protocol" associated with node 120 is a superset of field "dstPort" associated with parent node 112.

Figure 2A:
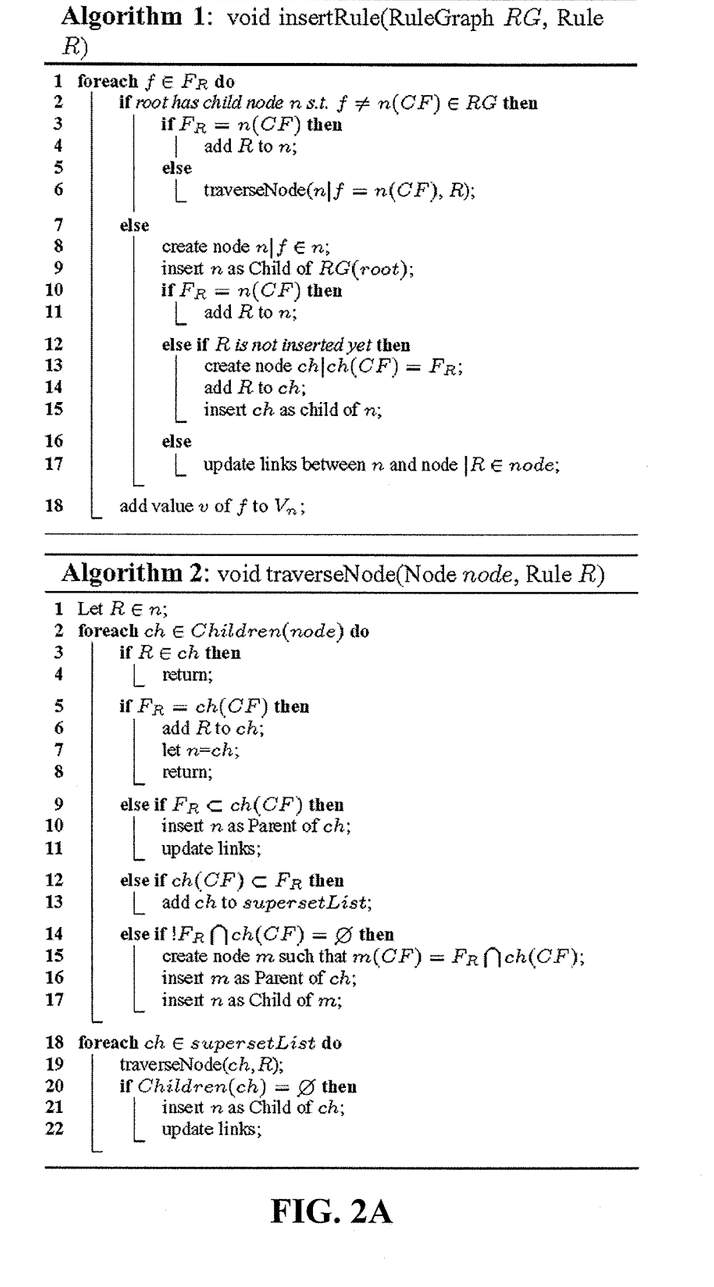
FIG. 2A is exemplary pseudo-code for inserting a rule into a rule relations graph.
Figure 2B:
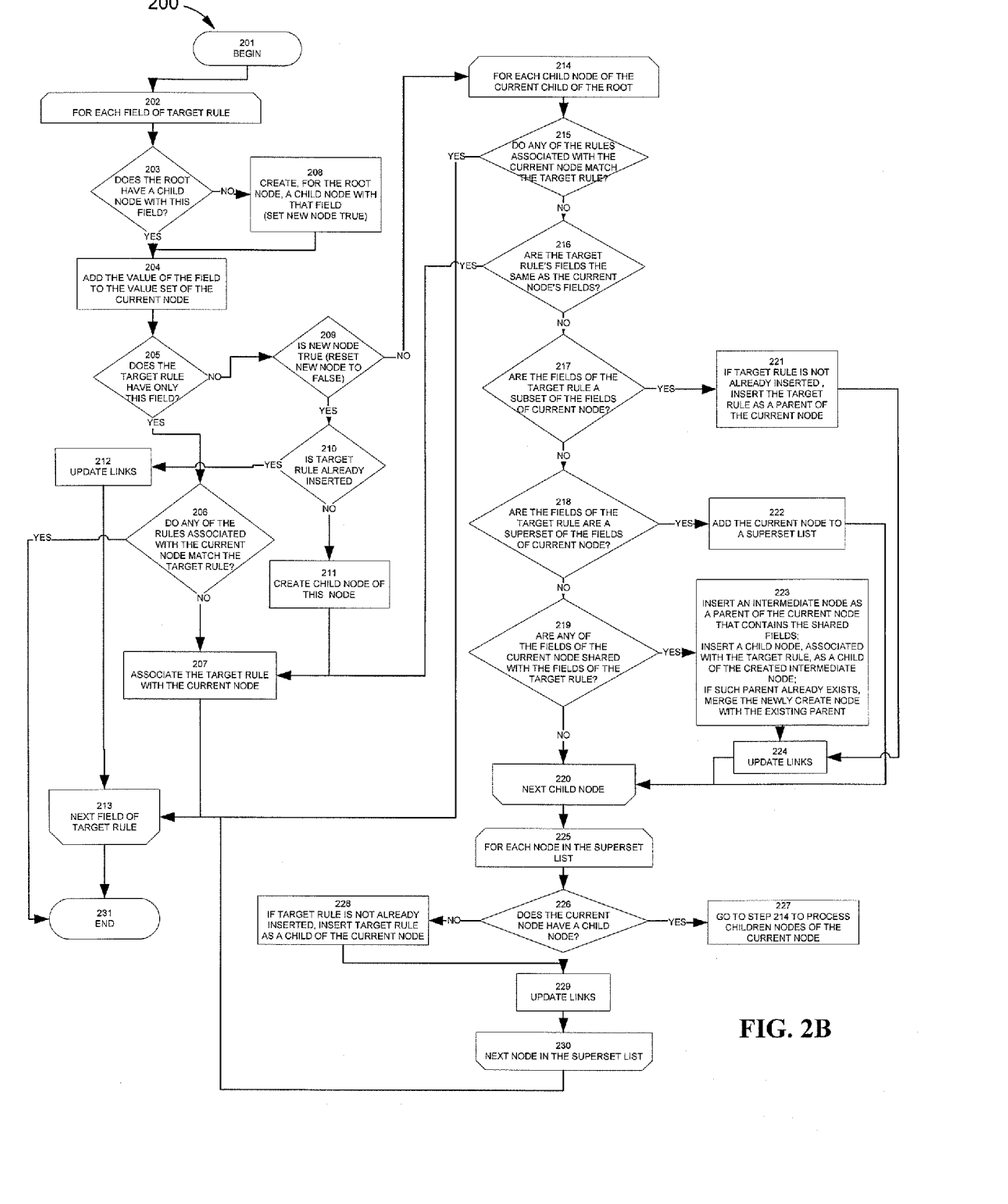
FIG. 2B is a flow chart illustrating an exemplary operation for inserting a rule into a rule relations graph based on the pseudo-code of FIG. 2A.

FIG. 2A is exemplary pseudo-code for inserting a rule into a rule relations graph. FIG. 2B is a flow chart illustrating an exemplary process 200 for inserting a rule into a directed graph 150 based on the pseudo-code of FIG. 2A.

The process 200 proceeds from beginning step 201 to loop step 202. The loop represented by steps 202 to 213 repeats for each field of the target rule (e.g., the new rule to be added). Beginning with the first field listed in the set of fields associated with the target rule, in step 202, the process 200 proceeds to decision step 203 in which a determination is made as to whether the root node 102 has a child node with the current field of the target rule. If, in decision step 203, the root node 102 has a child node with the current field of the target rule, then the process 200 proceeds to step 204 in which the value of the current field is added to the value set of the current node. If, in decision step 205, the target rule only has the current field (e.g., it is only associated with one field, the current field), then the process 200 proceeds to decision step 206. If, in decision step 206, the any of the rules associated with the current node match the target rule, the process 200 proceeds to end step 231. If, however, the target rule does not match any of the rules associated with the current node, as determined in decision step 206, then the process 200 proceeds to step 207 in which the target rule is associated with the current node and then to step 213 and the loop restarts at beginning loop step 202.

Returning to decision step 203, if the root node 102 does not have a child node associated with the current field of the target rule, then the process 200 proceeds to step 208, in which a new child node is created for the root node 102, the child node being associated with the current field, and the "new node" value being set as true. The process 200 then proceeds to step 204 as discussed above. In decision step 205, if the target rule is not only associated with the current field, then the process 200 proceeds to decision step 209 in which it is determined whether the "new node" value is set as true. If the new node value is not set as true, the process 200 proceeds to beginning loop step 214. If, however, the new node value is set as true in decision step 209, the value is reset to false, and the process 200 proceeds to decision step 210 in which it is determined whether the target rule has already been inserted in the graph. If the target rule is determined to already have been inserted in the graph, the process 200 proceeds to step 212, in which the links between the current node and any parent or child nodes are updated. If, however, in decision step 210 it is determined that the target rule has not already been inserted in the graph, then the process 200 proceeds to step 211, in which a child node of the current node is created. The process 200 then proceeds to step 207, as discussed above.

Loop steps 214 to 220 repeat for each child node of the current child of the root node 102 of the directed graph 150. In decision step 215, a decision is made as to whether any of the rules associated with the current node match the target rule to be inserted into the graph. If any of the rules associated with the current node do match the target rule to be inserted into the graph, the process 200 proceeds to end loop step 213. If, however, in decision step 215, it is determined that none of the rules associated with the current node match the target rule to be inserted into the directed graph 150, the process 200 proceeds to decision step 216. In decision step 216, if it is determined that the fields associated with the target rule are the same as the fields associated with the current node, then the process 200 proceeds to step 207 to associate the target node with the current node. If, however, in decision step 216, it is determined that the fields associated with the target rule are not the same as the fields associated with the current node, then the process 200 proceeds to decision step 217. In decision step 217, if it is determined that the fields associated with the target rule are a subset of the fields associated with the current node, then the process 200 proceeds to step 221. In step 221, if the target rule is not already inserted, the target rule is inserted as a parent of the current node. The process 200 then proceeds to step 224 in which the links between any parent nodes of the current node and any child node of the current nodes are updated. The process 200 then moves from step 224 to end loop step 220.

Returning to decision step 217, if it is determined that the set of fields associated with the target rule is not a subset of the set of fields associated with the current node, the process 200 proceeds to decision step 218. In decision step 218, if it is determined that the set of fields associated with the target rule is a superset of the fields associated with the current node, then the process 200 proceeds to step 222 in which the current node is added to the superset list, and the process 200 then proceeds to end loop step 220.

Returning to decision step 218, if it is determined that the set of fields associated with the target rule is not a superset of the fields associated with the current node, then the process 200 proceeds to decision step 219. In decision step 219, if it is determined that any of the fields associated with the current node are shared with the fields of the target rule to be inserted into the directed graph 150, then the process 200 proceeds to step 223. In step 223, an intermediate node is inserted as a parent of the current node that is associated with the shared fields. A child of the new intermediate node is then inserted and associated with the target rule. If, however, a parent node already exists that is identical to the intermediate node, then the intermediate node and the existing node are merged. The process 200 then proceeds from step 223 to step 224 as discussed above.

Returning to decision step 219, if it is determined that any of the fields associated with the current node are not shared with the fields of the target rule, then the process 200 proceeds to end loop step 220 in which the loop returns to step 214 for the next child node.

After the completion of the loop represented by steps 214 to 220, the process 200 proceeds to the loop represented by steps 225 to 230, which is repeated for each node in the superset list. Proceeding from beginning loop step 225 to decision step 226, if it is determined in decision step 226 that the current node has a child node, then the process 200 proceeds to step 227 in which the process 200 proceeds to step 214 to process the children nodes of the current node. If, however, in decision step 226, it is determined that the current node does not have a child node, then the process 200 proceeds to step 228 in which, if the target rule is not already inserted, a new node is inserted as a child of the current node and that new node is associated with the target rule. The process 200 then proceeds from step 228 to step 229 in which any node links are updated, and from step 229 to end loop step 230, which, as discussed above, returns to beginning loop step 225 for each node in the superset list. After the loop represented by steps 225 to 230 completes, e.g., after there are no nodes remaining in the superset list, the process 200 proceeds to step 213.

Having set forth in FIG. 2B a process 200 by which a rule is inserted into the directed graph 150 of FIG. 1, an example will now be presented using the process 200 of FIG. 2B and a new rule to be inserted, R5 (not illustrated), that is associated with the field "protocol" and the value "icmp"

The process 200 proceeds from beginning step 201 to loop step 202. Beginning with the first field listed in the set of fields associated with the target rule, the field "protocol," in step 202, the process 200 proceeds to decision step 203 where it is determined that the root node 102 has a child node, node 114, with the current field "protocol" of the target rule. The process 200 proceeds to step 204 in which the value of the current field, "icmp," is added to the value set 106 of the current node. In decision step 205, it is determined that the target rule R5 only has the current field "protocol," so the process 200 proceeds to decision step 206 where it is determined that there are no rules associated with the current node, and then the process 200 proceeds to step 207 in which the target rule R5 is associated with the current node 114. Then the process 200 proceeds to end loop step 213.

Figure 3A:
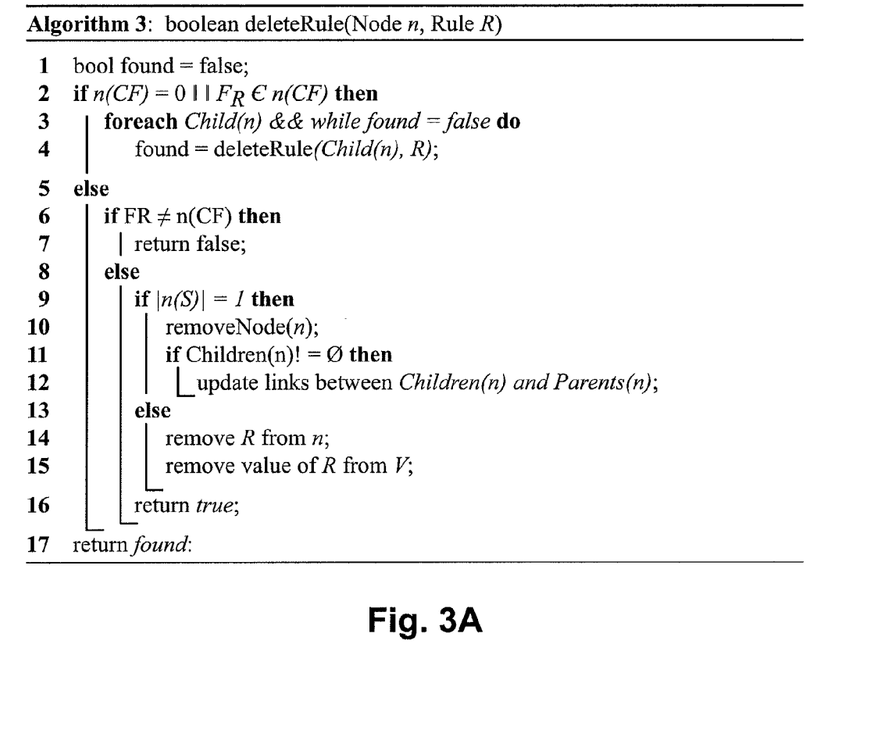
FIG. 3A is exemplary pseudo-code for removing a rule from a rule relations graph.
Figure 3B:
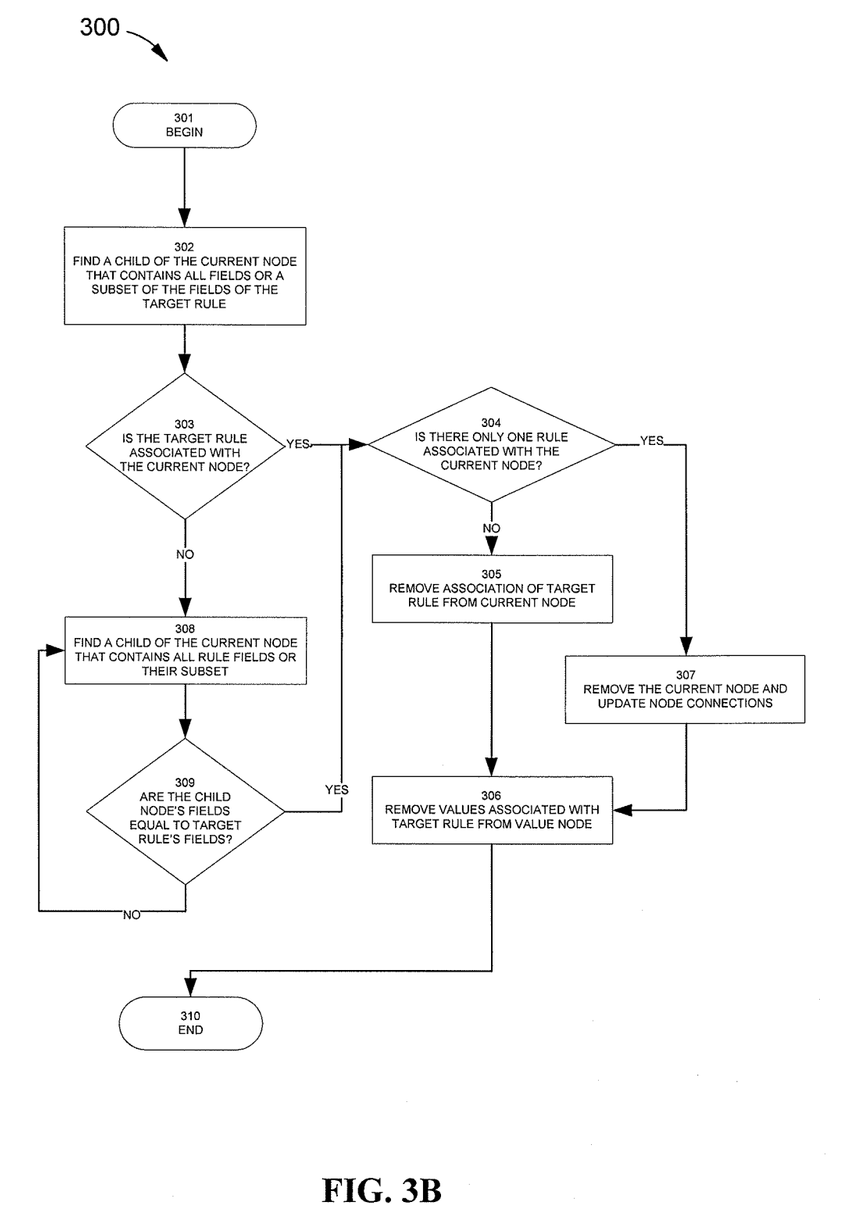
FIG. 3B is a flow chart illustrating an exemplary operation for removing a rule from a rule relations graph based on the pseudo-code of FIG. 3A.

FIG. 3A is exemplary pseudo-code for removing a rule from a rule relations graph. FIG. 3B is a flow chart illustrating an exemplary operation for removing a rule from a directed graph 150 based on the pseudo-code of FIG. 3A. The process 300 starts at the root node 102 and proceeds from beginning step 301 to step 302 where a child of the current node is found that is associated with a set of fields that is equal to or a subset of the set of fields associated with the rule to be removed ("target rule"). Once the child of the current node is found, the child, now the current node, is evaluated in decision step 303 to determine whether it is associated with the target rule.

If the current node is associated with the target rule, the process 300 proceeds to decision step 304 in which it is determined whether there is only one rule associated with the current node. If there is only one rule associated with the current node, the process 300 proceeds to step 307 in which the current node is removed and the associated node connections are updated. The process 300 then proceeds to step 306 in which the values associated with the target rule are removed from the corresponding value nodes (e.g., 104, 106, 108, and 110), and the process 300 then ends in step 310.

Returning to decision step 304, if it is determined that there is more than one rule associated with the current node, the process 300 then proceeds to step 305 in which the target rule is disassociated with the current node. The process 300 then proceeds to step 306, as discussed above.

Returning to decision step 303, if it is determined that the current node is not associated with the target rule, then the process 300 proceeds to step 308 in which a child of the current node is found that is associated with a set of fields that is equal to or a subset of the set of fields associated with the target rule. Next, in decision step 309, if it is determined the set of fields associated with the child node is equal to the set of fields associated with the target rule, then the process 300 proceeds to decision step 304 as discussed above. If, however, it is determined that the set of fields associated with the child node is not equal to the set of fields associated with the target rule, then the process 300 returns to step 308.

Having set forth in FIG. 3B a process 300 by which a rule is removed from the directed graph 150 of FIG. 1, an example will now be presented using the process 300 of FIG. 3B and rule R3 130 associated with node 124 from FIG. 1B.

The process 300 proceeds from beginning step 301 to step 302 where a child of the current node, the root node 102, is found that is associated a set of fields that is equal to or a subset of the set of fields associated with the rule to be removed ("target rule"). The found child node is node 112, since the set of fields associated with the node 112, field "dstPort," is a subset of the set of fields, "dstPort" and "network," associated with the target rule, R3 130. The child 112 is now the current node 112. In decision step 303 it is determined that node 112 is not associated with the target rule, so the process 300 proceeds to step 308 in which a child of the current node 112 is found that is associated with a set of fields that is equal to or a subset of the set of fields associated with the target rule. In this case, the child node that is found is node 124, since the set of fields associated with the node 124, fields "dstPort" and "network," are equal to the set of fields, "dstPort" and "network," associated with the target rule, R3 130. Next, in decision step 309, it is determined the set of fields associated with the child node 124 is equal to the set of fields associated with the target rule R3 130, so the process 300 proceeds to decision step 304, in which it is determined that there is only one rule associated with the current node, R3 130. The process 300 proceeds to step 307 in which the current node 124 is removed and the associated node connections are updated. In this case, only a parent connection is updated since node 124 is a leaf node, e.g., node 124 has no child nodes. The process 300 then proceeds to step 306 in which the values "81" and "external" associated with the target rule are removed from the respective value nodes dst-Port value node 104 and network value node 110 (unless these values are associated with other rules), and the process 300 then ends in step 310.

Figure 4A:
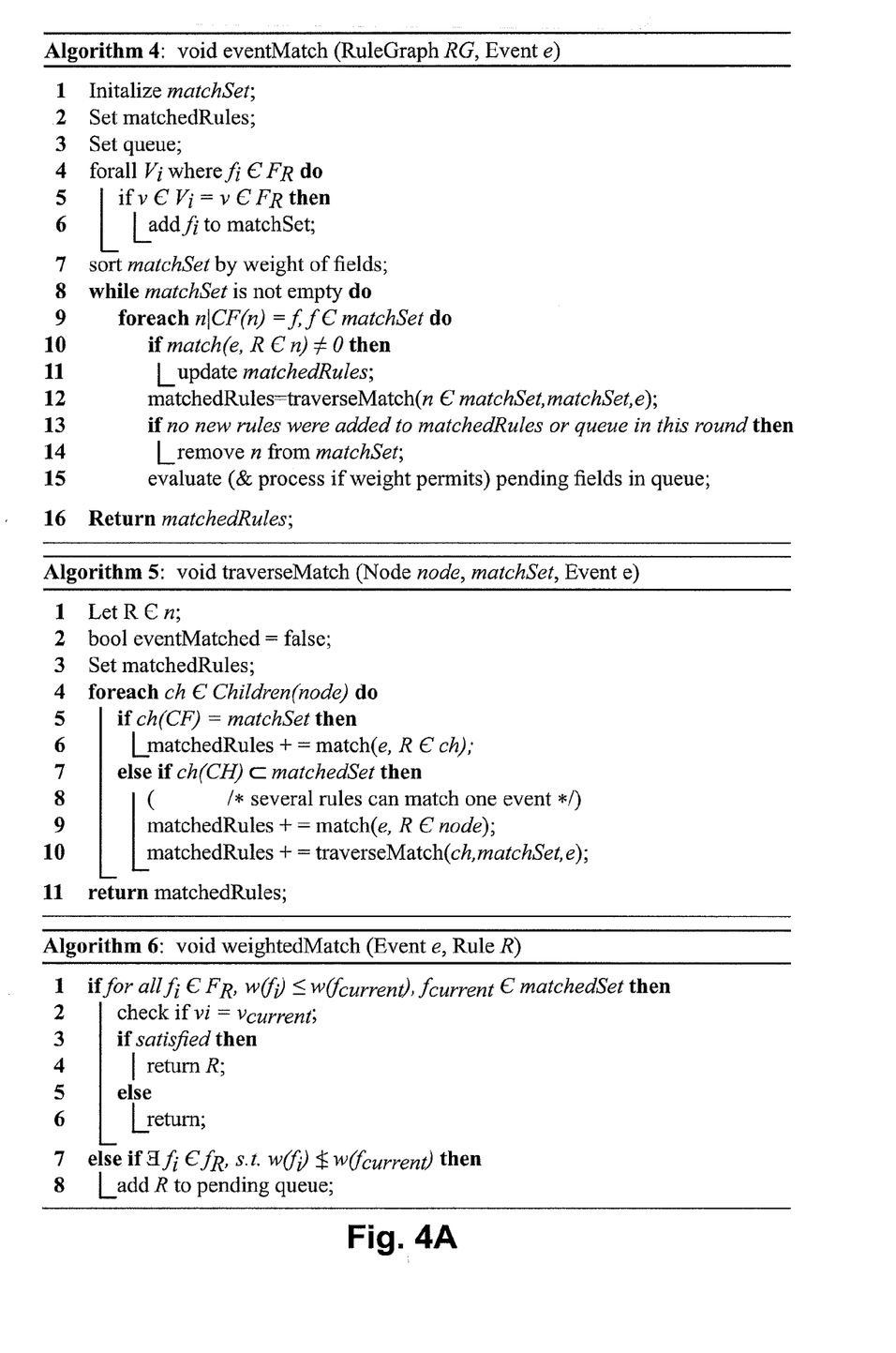
FIG. 4A is exemplary pseudo-code for traversing a rule relations graph to locate a rule matching an event.
Figure 4B:
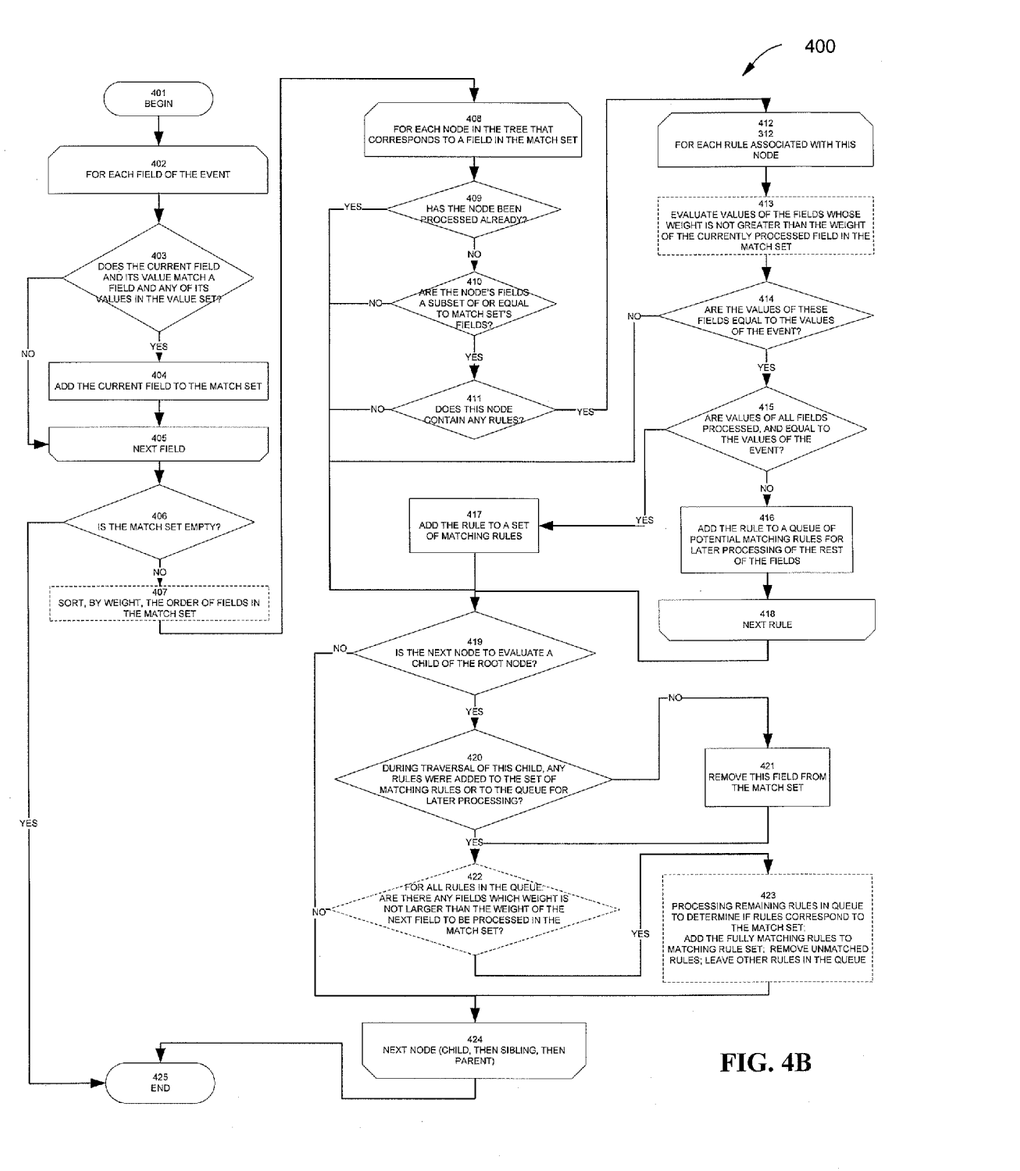
FIG. 4B is a flow chart illustrating an exemplary operation for traversing a rule relations graph to locate a rule matching an event based on the pseudo-code of FIG. 4A.

FIG. 4A is exemplary pseudo-code for traversing a rule relations graph to locate a rule matching an event. FIG. 4B is a flow chart illustrating an exemplary process 400 for traversing a directed graph 150 to locate a rule matching an event based on the pseudo-code of FIG. 4A. For embodiments of the disclosure that feature weighted nodes, optional steps shown in phantom are included.

The process 400 proceeds from beginning step 401 to beginning loop step 402. The loop represented by steps 402 to 405 repeats for each field associated with the event. In decision step 403, if it is determined that the current field associated with the event and its value matches a field and its value in the directed graph 150, the process 400 proceeds to step 404 in which the current field, including its associated value, is added to a match set, and the process returns from end loop step 405 to beginning loop step 402 for the next field of the event, if there is another field. Otherwise, in decision step 403, if it is determined that the current field associated with the event and its value does not match a field and its value in the directed graph 150, the process 400 proceeds to end loop step 405, and from there to beginning loop step 402 for the next field of the event, if there is another field.

After the loop represented by steps 402 to 405 is completed, it is determined in decision step 406 whether the match set is empty (e.g., if there are no fields in the set of fields associated with the match set). If the match set is empty, the process ends in step 425, because there is no rule in the directed graph 150 that matches the event (e.g., there are no nodes in the directed graph 150 that are associated with any of the same fields that are associated with the event). If the match set is not empty, the process 400 proceeds to optional step 407, in which the order of the fields in the set of fields associated with the match set (the "match set's fields") is ordered by the respective ascending weights of those fields. By sorting the match set's fields by weight, fields with lighter weights are evaluated first by the process 400 of FIG. 4 before fields with heavier weights.

The loop represented by steps 408 to 424 repeats for each node in the directed graph 150 that corresponds to a field in the match set. Proceeding from beginning loop step 408 to decision step 409, if it is determined that the current node has already been processed (e.g., visited), the process 400 proceeds to decision step 419. If, however, it is determined that the current node has not already been processed, the process 400 proceeds to decision step 410, in which it is determined whether the set of fields associated with the current node ("current node's fields") is equal to or a subset of the match set's fields. If it is determined that the current node's fields are not equal to or a subset of the match set's fields, the process 400 proceeds to decision step 419, otherwise the process 400 proceeds to decision step 411. In decision step 411, if it is determined that the current node is not associated with any rules, then the process 400 proceeds to decision step 419, otherwise the process 400 proceeds to beginning loop step 412.

The loop represented by steps 412 to 418 repeats for each rule associated with the current node. In optional step 413, for the current rule associated with the current node, each of the current rule's fields is evaluated if their weight is not greater than the weight of the match set's currently processed field. In decision step 414, if it is determined that the values of the current rule's fields processed in step 413 are equal to the values of the event's fields, then the process 400 proceeds to decision step 415, otherwise the process 400 proceeds to decision step 419. In decision step 415, if it is determined that all the event's fields have been processed, and their respective values are equal to the values of the current rule's fields, then the current rule is added to a set of matching rules in step 417, otherwise the rule is added to a queue of potentially matching rules for later processing in step 416. In end loop step 418, the process 400 returns to beginning loop step 412 for the next rule, if any, associated with the current node.

In decision step 419, if it is determined that the next node to evaluate is a child of the root node 102, then the process 400 proceeds to decision step 420, otherwise the process 400 proceeds to step 424. In decision step 420, it is determined whether, during traversal of the current child node's branch of the graph, any rules were added to the set of matching rules discussed above or to the queue of rules for later processing. If so, the process 400 proceeds to optional decision step 422, otherwise the process 400 proceeds to step 421. In step 421, the field associated with the current child node of the root 102 is removed from the match set, and the process 400 proceeds to optional decision step 422.

In optional decision step 422, it is determined, for all rules in the queue of matching rules for later processing, whether there are any fields whose associated weight is not larger than the weight of the next field to be processed from the set of fields associated with the match set. If there is such a field whose associated weight is not larger, then the process 400 proceeds to optional step 423, in which the remaining rules in the queue of matching rules for later processing are processed to determine if any rules in the queue correspond to the match set. The fully matching rules are added to the matching rule set, any unmatching rules are removed, and any remaining rules are left in the queue of matching rules for later processing. If, however, it is determined in optional decision step 422 that there is no such field whose associated weight is not larger than the weight of the next field to be processed from the set of fields associated with the match set, then the process 400 proceeds to end loop step 424.

In end loop step 424, the process 400 returns to beginning loop step 408 first for the next child node of the current node, then for the next sibling node of the current node when no child nodes remain, and finally to the parent node when no child or sibling nodes remain. After the loop represented by steps 408 to 424 completes, the process 400 ends in step 425.

Having set forth in FIG. 4 a process 400 for traversing a directed graph 150 to locate a rule matching an event, an example will now be presented using the process 400 of FIG. 4 and the following event registered by a network intrusion detection system: field "dstPort" value "81," field "payload" value "something," and field "protocol" value "udp."

The process 400 proceeds from beginning step 401 to beginning loop step 402. In decision step 403, it is determined that the current field "dstPort" and its value "81" matches a field and its value in the directed graph 150 (e.g., value node 104), so the process 400 proceeds to step 404 in which the current field and its associated value is added to a match set. The match set is currently {dstPort}. The process 400 returns from end loop step 405 to beginning loop step 402 for the next field of the event, "payload," and onto decision step 403. In decision step 403, it is determined that the current field "payload" and its value "something" matches a field and its value in the directed graph 150 (e.g., value node 108), so the process 400 proceeds to step 404 in which the current field and its associated value is added to a match set. The match set is currently {dstPort, payload}. The process 400 returns from end loop step 405 to beginning loop step 402 for the next field of the event, "protocol," and again onto decision step 403. In decision step 403, it is determined that the current field "protocol" and its value "udp" matches a field and its value in the directed graph 150 (e.g., value node 106), so the process 400 proceeds to step 404 in which the current field and its associated value is added to a match set. The match set is currently {dstPort, payload, protocol}. The process 400 proceeds to end loop step 405, and as there are no remaining fields left in the set of fields associated with the event, the loop ends, and the process 400 proceeds to decision step 406. The match set is {dstPort, payload, protocol}.

It is determined in decision step 406 that the match set is not empty, so the process 400 proceeds to optional step 407, in which the match set's fields are ordered by the respective ascending weights of those fields. Rule table 100 of FIG. 1 assigns a weight of 1 to field "dstPort," a weight of 9 to field "payload," and a weight of 1 to field "protocol." Accordingly, in optional step 407, the match set {dstPort, payload, protocol} is sorted by ascending weight as {dstPort, protocol, payload}.

The loop represented by steps 408 to 423 repeats for each node in the directed graph 150 that corresponds to a field in the match set. Thus, beginning with "dstPort" node 112, and the currently processed field set as "dstPort," in decision step 409 it is determined that the current node 112 has not already been processed, and then in decision step 410 it is determined the current node's 112 fields, {dstPort}, are a subset of the match set's fields, {dstPort, protocol, payload}, so the process 400 proceeds to decision step 411. In decision step 411, it is determined that the current node is not associated with any rules, so the process 400 proceeds to decision step 419.

In decision step 419, it is determined that the next node to evaluate, node 120, is not a child of the root node 102, so the process 400 proceeds to step 424, which indicates to return to the beginning of loop step 408 for the child of node 112, node 120.

Now with "dstPort, protocol" node 120, in decision step 409 it is determined that the current node 120 has not already been processed, and then in decision step 410 it is determined the current node's 112 fields, {dstPort, protocol}, are a subset of the match set's fields, {dstPort, protocol, payload}, so the process 400 proceeds to decision step 411. In decision step 411, it is determined that the current node is associated with a rule, rule R2 126, so the process 400 proceeds to beginning loop step 412.

The loop represented by steps 412 to 418 occurs only once since only one rule, rule R2 126, is associated with the current node, node 120. In optional step 413, for each of rule R2's 126 fields, "dstPort" and "protocol," it is determined that the fields' weights, each of which is 1, is not greater than the weight of the match set's currently processed field, "dstPort." In decision step 414, and with reference to the rule table 100 of FIG. 1A, it is determined that the values "1434" and "tcp" of rule R2's 126 fields, "dstPort" and "protocol," respectively, are not equal to the values of the event's fields, value "81" for field "dstPort" and value "udp" for field "protocol," so the process 400 proceeds to decision step 419. In decision step 419, it is determined that the next node to evaluate, node 132, is not a child of the root node 102, so the process 400 proceeds to step 424, which indicates to return to the beginning of loop step 408 for the child of node 120, node 132.

Now with "dstPort, protocol, payload" node 132, in decision step 409 it is determined that the current node 132 has not already been processed, and then in decision step 410 it is determined the current node's 132 fields, {dstPort, protocol, payload}, are equal to the match set's fields, {dstPort, protocol, payload}, so the process 400 proceeds to decision step 411. In decision step 411, it is determined that the current node is associated with a rule, rule R4 134, so the process 400 proceeds to beginning loop step 412.

The loop represented by steps 412 to 418 occurs only once since only one rule, rule R4 134, is associated with the current node, node 132. In optional step 413, it is determined that the weight of the field "payload" is greater than the weight of the match set's currently processed field, "dstPort," so the field "payload" will not be evaluated, while the remaining fields "dstPort" and "protocol" will be evaluated. In decision step 414, and again with reference to the rule table 100 of FIG. 1A, it is determined that the values "81" and "udp" of the rule R4's 134 fields, "dstPort" and "protocol," respectively, are equal to the values of the event's fields, so the process 400 proceeds to step 416, in which rule R4 134 is added to a queue of potentially matching rules for later processing of the remaining field, "payload." Since no other rules are associated with node 132, the loop represented by steps 412 to 418 ends, and the process 400 proceeds to decision step 419. In decision step 419, it is determined that the next node to evaluate, node 132, is not a child of the root node 102, so the process 400 proceeds to step 424, which indicates to return to the beginning of loop step 408 for the next child of node 112, node 122.

Proceeding beginning loop step 408 with "dstPort, payload" node 122, in decision step 409 it is determined that the current node 122 has not already been processed, and then in decision step 410 it is determined the current node's 122 fields, {dstPort, payload}, are a subset of the match set's fields, {dstPort, protocol, payload}, so the process 400 proceeds to decision step 411. In decision step 411, it is determined that the current node is associated with a rule, rule R1 128, so the process 400 proceeds to beginning loop step 412.

The loop represented by steps 412 to 418 occurs only once since only one rule, rule R1 128, is associated with the current node, node 122. In optional step 413, it is determined that the weight of 9 of field "payload" is greater than the weight of 1 of the match set's currently processed field, "dstPort," so the field "payload" will not be evaluated, and the remaining field, "dstPort," will be evaluated. In decision step 414, and with reference to the rule table 100 of FIG. 1A, it is determined that the value "1434" of the rule R1's 126 only evaluated field, "dstPort," is not equal to the value "81" of the event's "dstPort" field, so the process 400 proceeds to decision step 419. In decision step 419, it is determined that the next node to evaluate, node 132, is not a child of the root node 102, so the process 400 proceeds to step 424, which indicates to return to the beginning of loop step 408 for the child of node 122, node 132.

Now with "dstPort, protocol, payload" node 132, in decision step 409 it is determined that the current node 132 has already been processed, so the process 400 proceeds to decision step 419. In decision step 419, it is determined that the next node to evaluate, node 124, is a child of the root node 102, so the process 400 proceeds to decision step 420. In decision step 420, it is determined that during traversal of the "dstPort" branch of the graph (e.g., nodes 112, 120, 122, 124 and 132) that rule R4 134 was added to the queue of rules for later processing, so the process 400 proceeds to optional decision step 422.

In optional decision step 422, it is determined, for rule R4 134, that there are no fields for rule R4 134 that have not been processed that have a weight not larger than the next field to be processed, field "protocol" (e.g., the only remaining field to be processed for rule R4 134 is the field "payload" that has a weight of 9). The process 400 proceeds to step 424, which indicates to return to the beginning of loop step 408 for the next child of the root node 102, node 114.

Now with "protocol" node 114, and the currently processed field set as "protocol," in decision step 409 it is determined that the current node 114 has not already been processed, and then in decision step 410 it is determined the current node's 114 fields, {protocol}, are a subset of the match set's fields, {dstPort, protocol, payload}, so the process 400 proceeds to decision step 411. In decision step 411, it is determined that the current node is not associated with any rules, so the process 400 proceeds to decision step 419.

In decision step 419, it is determined that the next node to evaluate, node 120, is not a child of the root node 102, so the process 400 proceeds to step 424, which indicates to return to the beginning of loop step 408 for the child of node 114, node 120.

Now with "dstPort, protocol" node 120, in decision step 409 it is determined that the current node 120 has already been processed, so the process 400 proceeds to decision step 419. In decision step 419, it is determined that the next node to evaluate, node 132, is not a child of the root node 102, so the process 400 proceeds to step 424, which indicates to return to the beginning of loop step 408 for the child of node 120, node 132.

Now with "dstPort, protocol, payload" node 132, in decision step 409 it is determined that the current node 132 has already been processed, so the process 400 proceeds to decision step 419. In decision step 419, it is determined that the next node to evaluate, "payload" node 116, is a child of the root node 102, so the process 400 proceeds to decision step 420. In decision step 420, it is determined that during traversal of the "protocol" branch of the graph (e.g., nodes 114, 120, and 132) that no rules were added to the queue of rules for later processing, so the process 400 proceeds to step 421 in which the field "protocol" is removed from the match set. The match set is now {dstPort, payload}. Next, in optional decision step 422, it is determined, for rule R4 134, that there is a field, "payload," for rule R4 134 that has not been processed that has a weight that is not larger than the weight of the next field to be processed, field "payload" (e.g., the only remaining field to be processed for rule R4 134 is the field "payload" that has a weight of 9, and since the remaining field to be processed on the directed graph 150 is also the field "payload," the weights are equal). The process 400 proceeds to step 423, in which the processing of rule R4 134 is completed (e.g., the remaining field "payload" and its value of "something" in the match set is equal to the value of field "payload" in rule R4 134), whereby it is determined that rule R4 134 matches the match set and rule R4 134 is added to the matching rule set. The process 400 proceeds to step 424, which indicates to return to the beginning of loop step 408 for the child of root node 102, "payload" node 116.

Now with "payload" node 116, and the currently processed field set as "payload," in decision step 409 it is determined that the current node 116 has not already been processed, and then in decision step 410 it is determined the current node's 116 fields, {payload}, are a subset of the match set's fields, {dstPort, payload}, so the process 400 proceeds to decision step 411. In decision step 411, it is determined that the current node is not associated with any rules, so the process 400 proceeds to decision step 419. In decision step 419, it is determined that the next node to evaluate, node 122, is not a child of the root node 102, so the process 400 proceeds to step 424, which indicates to return to the beginning of loop step 408 for the child of node 116, node 122.

Now with "dstPort, payload" node 122, in decision step 409 it is determined that the current node 122 has already been processed, so the process 400 proceeds to decision step 419. In decision step 419, it is determined that the next node to evaluate, node 132, is not a child of the root node 102, so the process 400 proceeds to step 424, which indicates to return to the beginning of loop step 408 for the child of node 122, node 132.

Now with "dstPort, protocol, payload" node 132, in decision step 409 it is determined that the current node 132 has already been processed, so the process 400 proceeds to decision step 419. In decision step 419, it is determined that the next node to evaluate is not a child of the root node 102 because there are no additional nodes to evaluate in the directed graph 150 (e.g., the next node, "network" node 118, is not evaluated because the field "network" is not part of the match set as required by beginning loop step 408). The process 400 proceeds to step 424, which indicates there are no additional nodes to evaluate, so the process 400 ends in step 425.

The matching rule set contains one rule, rule R4 134. All rules in the set of rules did not need to be evaluated to find the rules that matched the event. In this case, three of the four rules were evaluated. The matching rule set can be processed at a time determined by the user in accordance with the needs of the system implementing the features, data structures, and processes disclosed above.

Figure 5:
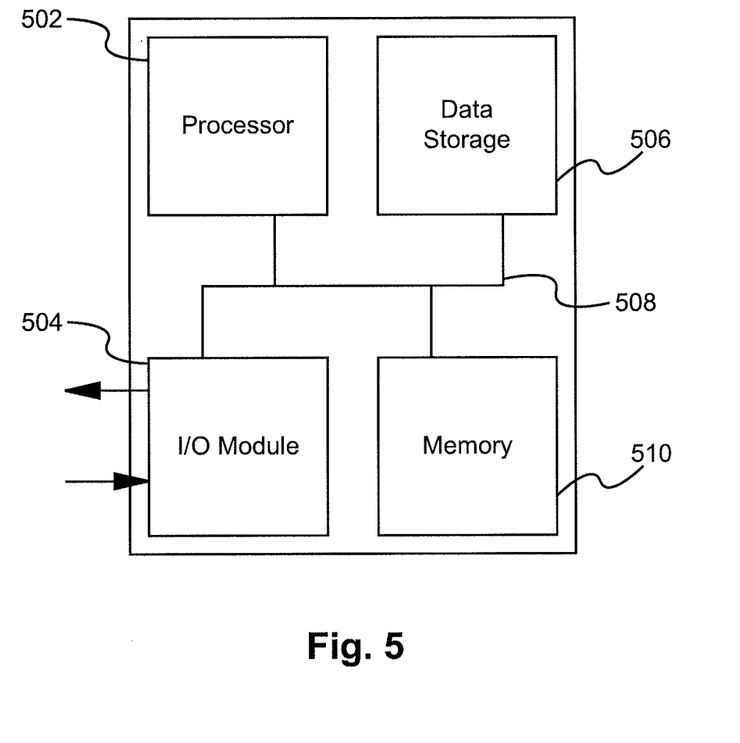
FIG. 5 is a block diagram illustrating an example of a computer system with which the disclosed systems and methods can be implemented.

FIG. 5 is a block diagram that illustrates a computer system 500 upon which an embodiment of the present disclosure may be implemented in accordance with one aspect of the present disclosure. In certain embodiments, computer system 500 can be used to implement, store, and execute the disclosed data structures, algorithms, and processes discussed above. In certain embodiments, the computer system 500 may be implemented using software, hardware, or a combination of both, either in a dedicated server, or integrated into another entity, or distributed across multiple entities.

Computer system 500 includes a bus 508 or other communication mechanism for communicating information, and a processor 502 coupled with bus 508 for processing information (e.g., for executing the processes discussed above). By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 500 also includes a memory 510 (e.g., for storing the data structure(s) discussed above), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The instructions may be implemented according to any method well known to those of skill in the art, including computer languages such as system languages (e.g., C, C++, Assembly), architectural languages (e.g., Java), and application languages (e.g., PHP, Ruby, Perl, Python). Memory 510 may also be used for storing temporary variable or other intermediate information during execution of instructions to be executed by processor 502. Computer system 500 further includes a data storage device 506, such as a magnetic disk or optical disk, coupled to bus 508 for storing information and instructions.

Computer system 500 may be coupled via I/O module 504 to a display device, such as a cathode ray tube ("CRT") or liquid crystal display ("LCD") for displaying information to a computer user. An input device, such as, for example, a keyboard, or a mouse may also be coupled to computer system 500 via I/O module 504 for communicating information and command selections to processor 502.

According to one aspect of the present disclosure, the structures, algorithms, and processes discussed above may be implemented using a computer system 500 in response to processor 502 executing one or more sequences of one or more instructions contained in memory 510. Such instructions may be read into memory 510 from another machine-readable medium, such as data storage device 506. Execution of the sequences of instructions contained in main memory 510 causes processor 502 to perform the process steps described herein. One or more processors in a multi-processing arrangement may also be employed to execute the sequences of instructions contained in memory 510. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 506. Transmission media include coaxial cables, copper wire, and fiber optics, including the wires that comprise bus 508. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Figure 6A:
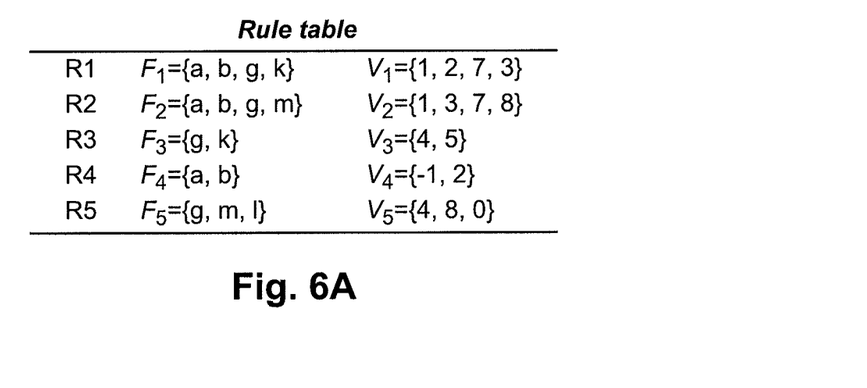
FIG. 6A illustrates an exemplary rule table for any type of event according to one embodiment.
Figure 6B:
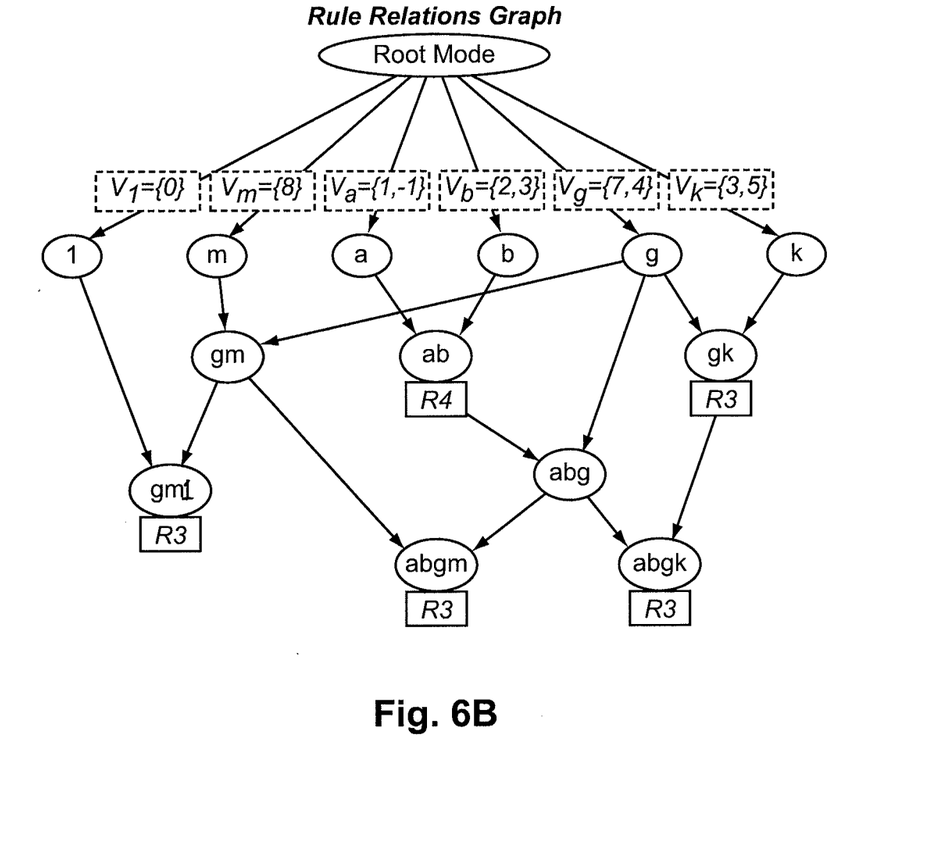
FIG. 6B illustrates a directed graph representing the table of FIG. 6A according to certain embodiments of the disclosure.
Figure 7A:
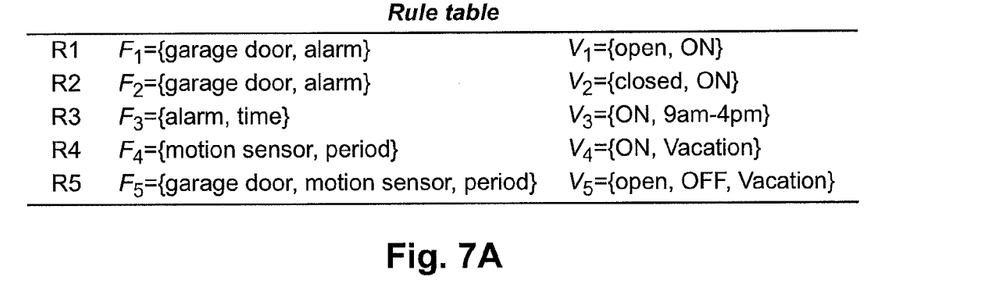
FIG. 7A illustrates an exemplary rule table for a home alarm monitoring system according to one embodiment.
Figure 7B:
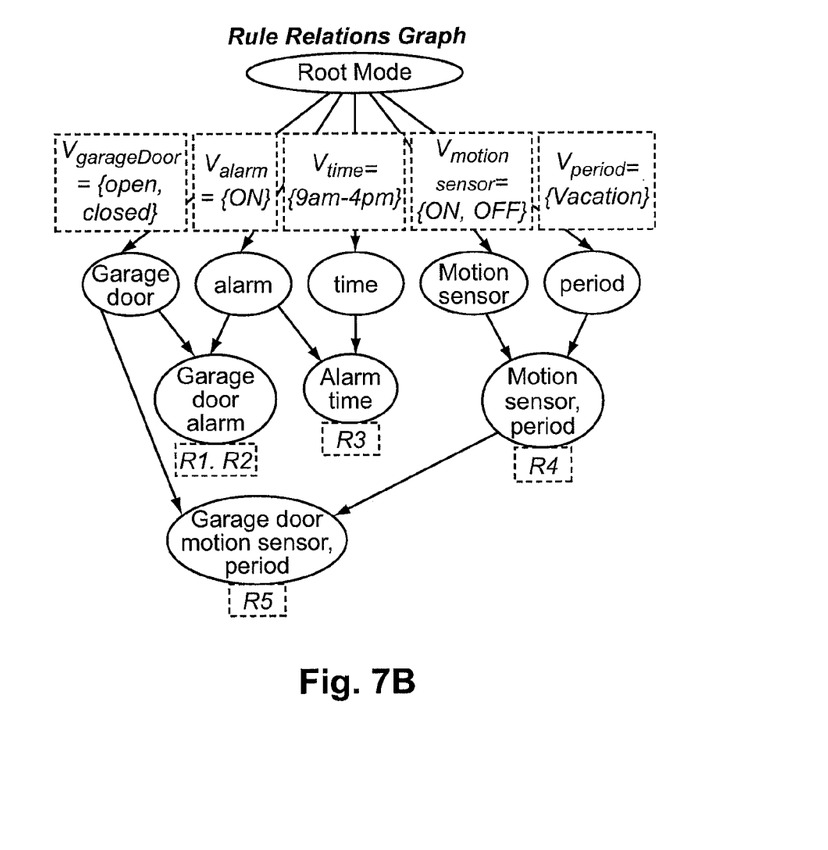
FIG. 7B illustrates a directed graph representing the table of FIG. 7A according to certain embodiments of the disclosure.
Figure 8A:
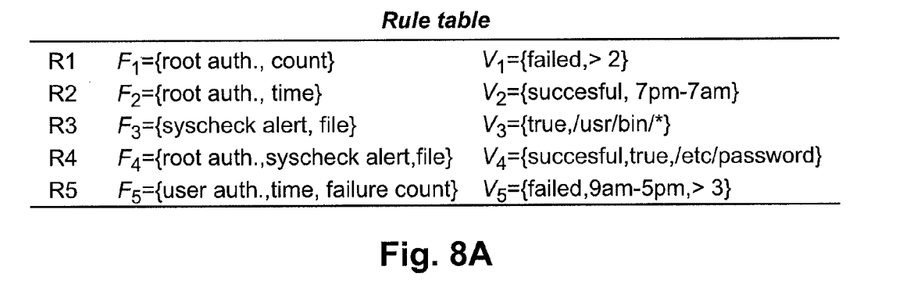
FIG. 8A illustrates an exemplary rule table for a host security monitoring system according to one embodiment.
Figure 8B:
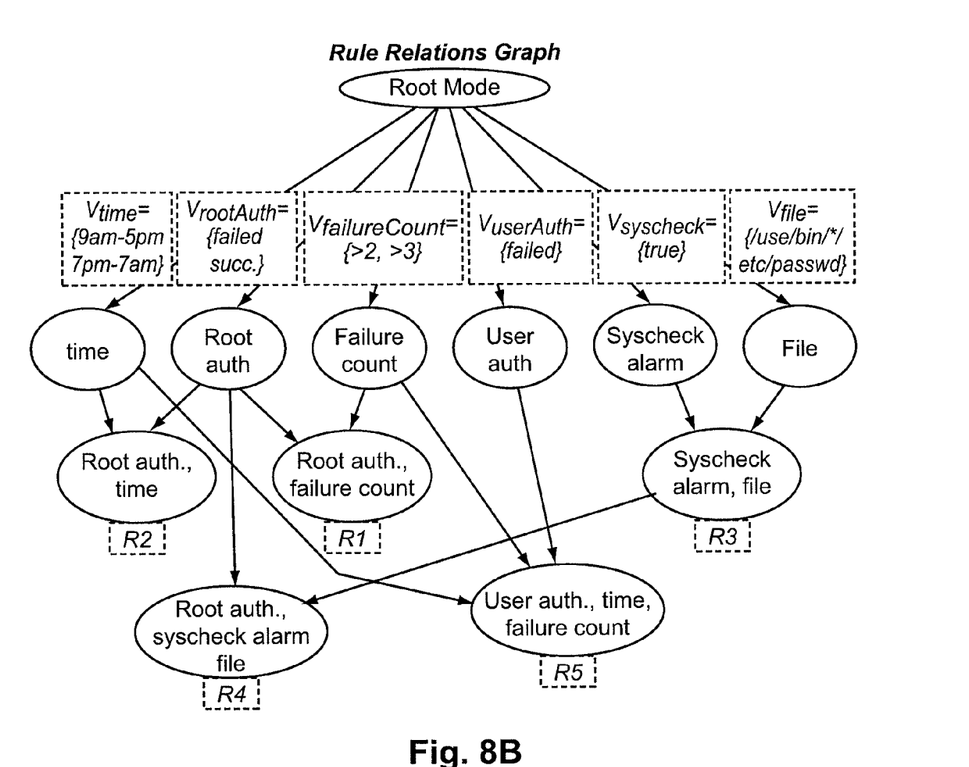
FIG. 8B illustrates a directed graph representing the table of FIG. 8A according to certain embodiments of the disclosure.

Although the processes and data structures described above have been discussed with reference to events in a network security system, the processes and data structures disclosed herein are equally applicable to other systems. For example, FIG. 6A illustrates an exemplary rule table for any type of event according to one embodiment, and FIG. 6B illustrates a directed graph representing the table of FIG. 6A according to certain embodiments of the disclosure. FIG. 7A illustrates an exemplary rule table for a home alarm monitoring system according to one embodiment, and FIG. 7B illustrates a directed graph representing the table of FIG. 7A according to certain embodiments of the disclosure. FIG. 8A illustrates an exemplary rule table for a host security monitoring system according to one embodiment, and FIG. 8B illustrates a directed graph representing the table of FIG. 8A according to certain embodiments of the disclosure.

The embodiments of the present disclosure provide a system in which system events are more quickly processed and matched against rules by organizing the rules according to a rule relations graph. The rule relations graph, which can be represented as a partially ordered graph, facilitates the processing of system events against rules associated with nodes in the graph.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for matching a system event to a rule, the system comprising:
   a computer-readable data structure comprising a plurality of system event rules organized as a graph having a plurality of nodes, at least one node corresponding to a field in a rule and having a weight value;
   a processor configured to analyze the computer-readable data structure to determine whether an event comprising at least one field matches a description set of at least one rule from the plurality of system event rules by:
      for a node in the graph, comparing the field corresponding to the node to each field in the event;
      in the event of a match between the compared fields, adding the field to a list of matches; and
      sorting the list of matching fields according to the weight associated with each matching field.

2. The system of claim 1, wherein each rule is associated with a description set, and wherein a description set comprises at least one field and at least one response action.

3. The system of claim 1, wherein the system event rules are intrusion detection rules, and wherein the event is an indication of an incoming event on an electronic network.

4. The system of claim 1, wherein the processor is further configured to generate a match set based on the system event, and wherein determining whether an event matches a description set of at least one rule from the plurality of system event rules comprises identifying whether the at least one rule is associated with a set of fields that is a subset of, or equal to, a set of fields associated with the match set.

5. The system of claim 4, wherein the set of fields associated with the match set comprises at least one field, and a value associated with the field, from the system event.

6. A method for matching a system event to a rule comprising:
   receiving an incoming event comprising at least one field;
   traversing a computer readable-data structure comprising a plurality of system event rules organized as a graph having a plurality of nodes, at least one node corresponding to a field in a rule and having a weight value;
   for a node in the graph, comparing the field corresponding to the node to each field in the event;
   in the event of a match between the compared fields, adding the field to a list of matches;
   sorting the list of matching fields according to the weight associated with each matching field; and
   processing, using a computer, at least one rule associated with the plurality of nodes.

7. The method of claim 6, wherein the processing the at least one rule associated with the plurality of nodes is based on a weight associated with at least one field from the set of fields associated with the plurality of nodes.

8. The method of claim 7, wherein the set of fields associated with the plurality of nodes comprises at least two fields, and wherein the processing the at least one rule associated with the plurality of nodes based on the weight comprises processing a first field of the at least two fields if the first field has a smaller associated weight than a weight associated with a second field of the at least two fields.

9. The method of claim 6, wherein the set of fields associated with the match set comprises at least one field, and a value associated with the field, from the incoming system event.

10. The method of claim 6, wherein a new rule associated with a set of fields is associated with the rule relations graph according to steps comprising:
    identifying a first node, in the rule relations graph, associated with a field that is a member of the set of fields associated with the new rule;
    creating a parent node of the first node; and
    associating a field in the new rule with the parent node.

11. The method of claim 10, wherein the first node is identified by traversing nodes associated with a set of fields that is a subset of, or equal to, the set of fields associated with the new rule.

12. The method of claim 6, wherein a new rule is associated with the rule relations graph according to steps comprising:
    identifying a first node, in the rule relations graph, associated with a set of fields that are shared with the set of fields associated with the new rule;
    creating an intermediate node associated with one of the shared fields.

13. The method of claim 12, wherein the first node is identified by traversing nodes associated with a set of fields that is a subset of, or equal to, the set of fields associated with the new rule.

\* \* \* \* \*